United States Patent [19]

Robinson

[11] Patent Number: 4,834,475

[45] Date of Patent: May 30, 1989

[54] HOLOGRAPHIC ANALOGUE INDICATING MEANS

[76] Inventor: Anthony J. Robinson, 46 Castelnau Mansion, Barnes, London, England, SW13 9QQ

[21] Appl. No.: 937,194

[22] PCT Filed: Mar. 7, 1986

[86] PCT No.: PCT/GB86/00131

§ 371 Date: Nov. 6, 1986

§ 102(e) Date: Nov. 6, 1986

[87] PCT Pub. No.: WO86/05269

PCT Pub. Date: Sep. 12, 1986

[30] Foreign Application Priority Data

Mar. 7, 1985 [GB] United Kingdom .................. 8585969
Jul. 15, 1985 [GB] United Kingdom .................. 8517820
Dec. 2, 1985 [GB] United Kingdom .................. 8529614

[51] Int. Cl.$^4$ ........................ G03H 1/28; G04B 19/06; G01B 11/00

[52] U.S. Cl. .................... 350/3.75; 350/3.77; 350/3.85; 356/372; 356/375; 368/79

[58] Field of Search ...................... 350/3.85, 3.7, 3.75, 350/3.77; 368/79; 356/372, 375

[56] References Cited

FOREIGN PATENT DOCUMENTS

2086223 12/1971 France .
58-75085 7/1983 Japan .

Primary Examiner—Bruce Y. Arnold
Attorney, Agent, or Firm—Lowe, Price, LeBlanc, Becker and Shur

[57] ABSTRACT

In an analogue indicating device (e.g. a clock) in which the relative positions of two relatively movable components (FIGS. 1-3; 26/28 and 12) is judged by the position of a reference marker (30/32) on one of the components (26/28) in relation to an adjacent scale (48) on the other component (12), the scale is constituted by a hologram (in 12) which when illuminated by a predetermined reference light (33) portrays a desired image of the scale (48) against which the reference marker (26/28) is seen. That image may also portray an environment (34) (e.g. a clock case) in which the scale (48) appears to be contained. The reference marker (26/28) may also be constituted by a hologram for portraying a holographic image of the reference marker. Alternatively, a holographically portrayed reference marker may cooperate with a real scale. The holographically produced image is preferably coplanar with the other image, whether the latter image be real or holographically produced, so as to eliminate parallax errors. Any suitable form of hologram may be used. The use of the invention in relation to time-keeping devices (FIGS. 1-3), electrical indicating instruments (FIGS. 4-5), dimension measuring devices (FIGS. 16-21 and 28-31), and operating mode adjusters (FIGS. 14, 15, 22, 23) and selectors (FIGS. 24-27) is described.

26 Claims, 5 Drawing Sheets

HOLOGRAPHIC ANALOGUE INDICATING MEANS

TECHNICAL FIELD

This invention relates to analogue indicating means for conveying to an observer information represented by the position of one of two relatively movable components relative to the other of the two components.

BACKGROUND ART

For convenience, one of those components commonly has a pointer, needle or other reference marker (referred to hereafter for the sake of simplicity as a 'reference marker') designating a reference position on that one component; and the other of the two components commonly has a series of markers or markings spaced apart on a scale, dial, or face (referred to hereafter for the sake of simplicity as a 'scale') and relative to which scale markings the reference marker is relatively movable. The position of one component relative to the other is represented by the position of said reference marker relative to the series of scale markings.

In many cases, (e.g. in clocks and other analogue time-keeping devices, and electrical indicating instruments), the relative positions of the reference marker and the associated series of scale markings is indicative to an observer of the value of a parameter whose magnitude governs or controls the relative positions of the said two components.

In other cases, (e.g. in radio wave-band or other multi-position, operating mode selectors) the relative positions of that reference marker and the associated series of scale markings are indicative to an observer of (a) the relative positions of the two components to which they have been deliberately brought in selecting a desired one of a predetermined plurality of operating modes for an associated apparatus, and hence of (b) the selected operating mode of such apparatus.

In yet other cases (e.g. in linear and other dimension measuring devices) the reference marker may comprise a selected feature of an article, the position of which relative to a datum is to be ascertained in relation to a series of scale markings (constituting a measuring scale) placed adjacent to the article, either directly or by means of a movable probe.

Thus, the present invention relates to various different kinds of analogue indicating means, some of which have been recited above by way of example.

In some such indicating means its is often very difficult to accurately determine the position of the reference marker in relation to the scale markings, for the reason that the reference marker and the associated scale markings are not coplanar, so that the perceived position of the reference marker is dependent upon the position of the observer's eyes, and the interpretation placed upon that perceived position by the observer.

Furthermore, the accurate mass reproduction of such a series of scale markings is difficult and costly to achieve.

Disclosure of the Invention

According to the present invention, in an analogue indicating means which comprises two relatively movable components bearing respectively a reference marker, and a series of scale markings spaced apart along a scale portion, and in which the position of the reference marker relative to the scale markings is indicative to an observer of the relative positions of the two components, at least one of the two components comprises a hologram (or holographic element) which when illuminated by a source of a predetermined reference light portrays to a said observer a holographic image of the reference marker or holographic images of the scale markings, as appropriate to the said one component, for comparison with respectively the scale markings or the reference marker of the other of the two components.

Such an arrangement offers a useful alternative to existing forms of indicating means, in that holograms are easily reproducible and may portray in addition any real or fictional pictorial effect or environment.

Preferably, the said hologram is arranged so as to project the holographic image or images into the plane of the scale markings or reference marker respectively of the other of the two components.

By that means, the problem of accurately interpreting the position of the reference marker in relation to the associated scale is greatly facilitated, since the observer will always perceive the reference marker (when occupying a given position) as lying in the same position relative to the scale no matter from what position or angle the observer views the reference mark and scale.

Thus, the present invention provides a means of eliminating parallax errors when reading the indications of measuring devices. If desired, the said other of the two components comprises a hologram which when illuminated by a said source of reference light portrays to the observer a series of holographic images of the scale markings or a holographic image of the reference marker, as appropriate to the said other component, for comparison with respectively the holographic reference marker image or holographic scale markings images associated with the said one component.

The respective holograms may be arranged so as to project their respective holographic images into a predetermined common plane, so as to be perceived there by a said observer in coplanar relationship, thereby eliminating the possibility of parallax errors.

The said one component may comprise a hologram arranged to project holographic images of the scale markings forwardly towards the observer into a plane forwards of the hologram, in or adjacent which plane the reference marker of the said other component is arranged to move; or alternatively, the said one component may comprise a hologram arranged to project holographic images of the scale markings rearwardly away from the observer into a plane disposed rearwards of the hologram, in or adjacent which plane the reference marker of the said other component is arranged to move.

In either of those cases, the said other of the two components may comprise a hologram arranged so as to project a holographic image of the reference marker into a plane in or adjacent which the holographic scale markings are perceived by the observer.

The hologram of the said one component may also be arranged to project holographic images of other desired features of the said one component, which features lie adjacent or enclose the series of scale markings, and so provide an imaged environment in which the reference marker may be seen by the observer.

The component bearing a reference marker may alternatively comprise a workpiece or specimen having as the said reference marker a selected feature whose position relative to a predetermined datum is to be measured when the workpiece is introduced temporarily into a measuring position adjacent the component bearing the scale markings, in which case the component bearing the scale markings may be constituted by a hologram which when illuminated by a source of said reference light portrays holographic images of the scale markings, which holographic images appear to a said observer as lying in a measurement plane which intersects the reference marker feature on the workpiece. Such scale markings may comprise successive markings denoting successive increments of length, or alternatively successive increments of angle.

Such a measurement indicating means may also include a magnifying system through which a said observer may observe the workpiece or specimen and the said holographic images. In such an indicating means, the hologram may be disposed between the magnifying system and the workpiece or specimen, or alternatively on the side of the workpiece or specimen that is remote from the magnifying system.

Other preferred features of the present invention will appear from a reading of the description that follows hereafter and from the claims appended at the end of that description.

Various embodiments of the present invention will now be described by way of example and with reference to the accompanying diagrammatic drawings.

MODES OF CARRYING OUT THE INVENTION

In the different embodiments to be described below, the same, or similar, or analogous parts bear corresponding references in the respective FIGS., wherever appropriate.

Figure 1:
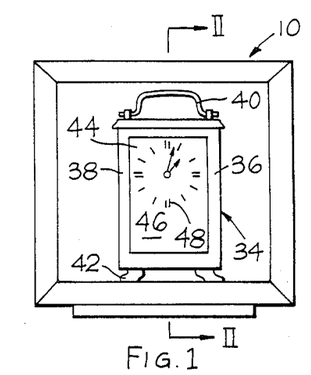
FIG. 1 shows a front view of a clock embodying the present invention.
Figure 2:
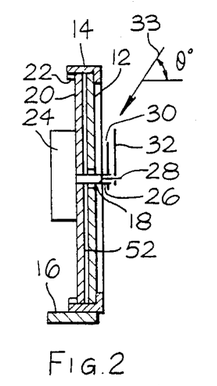
FIG. 2 shows a vertical sectional view of the clock of FIG. 1, taken on the section line designated II—II in that FIG.

Referring now to the FIGS. 1 and 2, the clock 10 there shown comprises a holographic plate 12 mounted at its periphery in a frame 14 which is provided with a foot 16. That plate 12 is provided with an aperture 18. Mounted behind the holographic plate 12 is a support or back plate 20 of an opaque material, which is held firmly in place by retaining members 22. The support plate 20 carries on its rear surface a quartz type electrically-operated clock movement or mechanism 24. Hour and minute spindles 26, 28 protruding from that mechanism project forwardly through the aperture 18 in the holographic plate 12, and carry in front of that plate hour and minute hands 30, 32 respectively.

In the absence of illumination on the holographic plate 12 from a source of a predetermined reference light (preferably a coherent light) the holographic plate presents outwardly the normal plain colouration of such a plate, so that the hand 30, 32 are seen against a plain clock face constituted by the holographic plate and having no distinguishing features.

However, upon illuminating that holographic plate with light (represented by the arrow 33) from a said source of predetermined reference light, which light is directed at the holographic plate at a predetermined reference angle, a person observing the clock will perceive a three-dimensional image 34 of, in this instance, a polished brass carriage clock 36 comprising a case 38 having uppermost a carrying handle 40, lowermost a set of feet 42, glass panels 44 at the front, back and sides, and within the case a white enamel clock face 46 having inscribed thereon a ring of hour markings or designations 48 centred upon the said aperture 18 in the holographic plate 12.

Thus, the observer now sees the hour and minute hands 30, 32 as if they were properly part of, and rotating in, the carriage clock which is portrayed by the illuminated holographic plate 12. In accordance with the normal properties of such a holographic plate, the observer on moving his head relative to the clock 10 of the FIGS. 1 and 2 will see a change in the image of the carriage clock 36, which change corresponds to the change that he would have observed in making a similar movement in relation to the actual carriage clock which is now portrayed in the holographic plate 12.

The holographic plate 12 incorporates an opaque, reflective type hologram of the carriage clock, which hologram has been made by standard holographic techniques using the actual carriage clock 36 and a source of the same reference light as is used to illuminate the clock 10 to reveal the image of the carriage clock 36. That hologram may be arranged so that the carriage clock face 46 perceived by the observer is seen as lying behind the hour and minute hands 30, 32, in the normal manner of a clock.

Alternatively, the hologram may be arranged to throw the image of the carriage clock face forwardly towards those hands, so as to present the ring of hour markings 48 as if it were in the plane of one of the clock hands 30, 32 or even in a plane between them.

Figure 3:
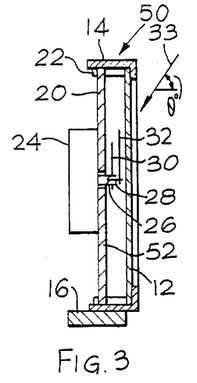
FIG. 3 shows a view similar to that of FIG. 2, taken on a similar section line, of a modified form of the clock of FIG. 1.

A modified form 50 of the clock 10 is shown in the FIG. 3, and has a construction that is generally similar to that of the clock 10, though it is distinguished by the following differences. In the modified clock, the holographic plate 12 has no aperture corresponding to the aperture 18, and is transparent, so that an observer may see through it. Hence, the clock spindles 26, 28 do not penetrate the holographic plate, but carry their respective hour and minute hands 30, 32 in enclosed positions disposed to the rear of the holographic plate 12. The clock movement support plate 20 is preferably opaque, though if desired, it may be translucent.

With the modified clock 50 unexposed to light 33 from a said source of reference light, the observer will see through the holographic plate and observe the clock hands moving around a plain background provided by the support plate 20.

The holographic plate in this modified clock 50 also differs from that of the clock 10, in that when it is illuminated by light from a said source of said predetermined reference light, the observer perceives an image of the same carriage clock 36 with the clock face 46 appearing to lie behind the two clock hands 30, 32 in the conventional way. As an alternative, that hologram may be arranged so as to provide, when so illuminated, an image in which the clock face is seen to be coplanar with the hour hand, or alternatively, coplanar with the minute hand, or if so desired, lying between the planes of those two hands.

As in the case of the clock 10 of the FIGS. 1 and 2, movement of the observer's head relative to the clock 50 will provide correspondingly different three-dimensional images of the carriage clock.

It will be appreciated that the observer of this modified clock 50 will see before him a clock having a frontal appearance which is much the same as that of the clock 10 depicted in the FIGS. 1 and 2, so that the frontal appearance of the modified clock is quite adequately represented by FIG. 1.

By arranging the hologram of the original clock 10 or of the modified clock 50 so as to present a clock face which appears to lie in a plane positioned at one of, or between, the two planes in which the respective hour and minute hands 30, 32 rotate, the risk of parallax errors occurring when reading the time is greatly diminished, or even eliminated.

The holographic plate 12 may comprise a glass plate, or a film of a plastics material, which plate or film is transparent for the clock 50, and which plate or film may carry or comprise any suitable light sensitive material (e.g. silver halide or dichromate emulsions, or polymer materials). Moreover, the holographic plate may be made by any suitable holographic image producing process or technique, such as for example, those known as reflection, image plane, rainbow, open aperture, transmission and pseudoscopic techniques.

Multiplex, multiple image (using different reference beams for constructing different calibration scales), colour, multiple reference and other suitable holographic techniques, and lenticular systems, can also be used in the holographic producing process.

Furthermore, the holographic plate 12 of the clock 50 is preferably not laminated or sprayed with any other material, so as not to impair its transparency.

The front surface 52 of the clock movement support plate 20 in both of the clocks 10 and 50 is preferably matt black, though where rainbow effects are desired, that front surface may be silvered in the manner of a mirror surface.

If desired, the mechanical reference markers constituted by the hour and minute hands 30, 32 may be replaced by an electrically energisable array of liquid crystal elements and an appropriate driver circuit arranged to energise selected elements of that array in sequence so as to simulate the hour and minute hands of a clock and their movement relative to a stationary clock face produced by illumination of the holographic plate 12.

In the modified clock 50 the distance of the movement support plate 20 from the holographic plate 12 may be made readily adjustable so as to suit the depth of perspective of the particular three-dimensional holographic image 34 to be portrayed by the holographic plate. Thus, for different holographic images to be provided in different versions of the clock 50 (portraying different types of real clock), that distance is adjusted to suit the image to be produced by the selected one of a variety of different holographic plates. It will be appreciated that one clock construction as portrayed in the FIGS. 1 and 3 (or in the FIGS. 1 and 2) may be used to produce holographic equivalents of many different types of clock, from the very old to the very new, the only variables being the holographic plate 12, the clock hands, and the distance between the holographic and support plates 12 and 20.

The principles of construction, and the mode of operation, described above in relation to the clocks 10 and 50 may be applied in other fields where the position of one or more reference markers relative to an associated scale or dial needs to be determined with high accuracy and with minimal risk of parallax error: for example, in the field of indicating instruments which employ a transducer to mechanically drive a needle or pointer over an associated scale or dial in accordance with the varying magnitude of a parameter that is to be measured or monitored by the instrument.

Figure 4:
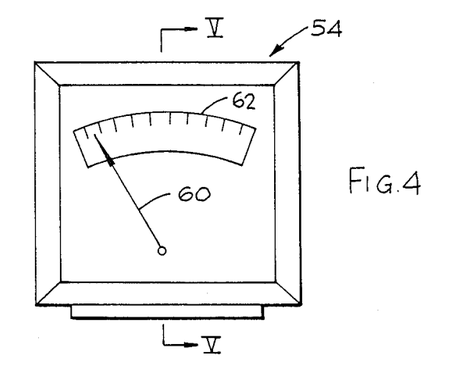
FIG. 4 shows a front view of an electrical ammeter embodying the present invention.
Figure 5:
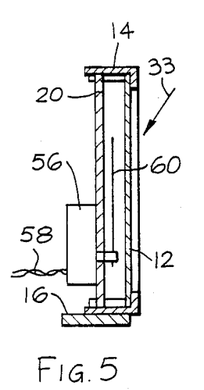
FIG. 5 shows a vertical sectional view of the ammeter of FIG. 4, taken on the section line designated V—V in that FIG.
Figure 6:
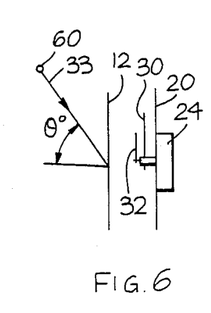
FIGS. 6 to 13 show respectively various alternative arrangements of the principle components of the measuring devices of the earlier FIGS.
Figure 7:
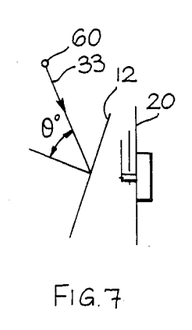
Figure 8:
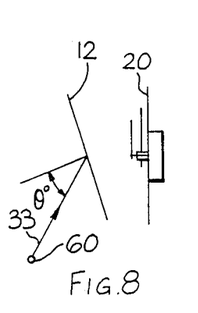
Figure 9:
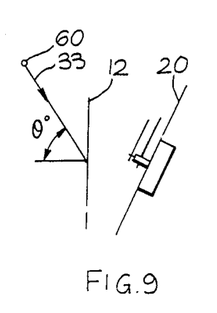
Figure 10:
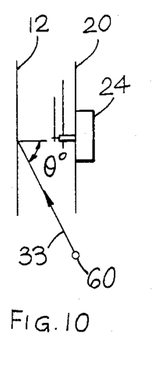

Such an instrument is illustrated in the FIGS. 4 and 5, which depict an ammeter 54 constructed in accordance with the principles of the present invention, and using the same form of construction as that used in the clock 50. In that ammeter 54, the movement support plate 20 carries at its rear side a transducer 56 which is arranged for energisation via a circuit 58 in accordance with an electric current that is to be monitored. The transducer drives a needle or pointer 60 which is arranged for angular deflection relative to an image of a fixed scale 62 which is perceivable by an oberver by virtue of a hologram incorporated in a holographic plate 12 when that plate is illuminated by light 33 from a said source of a predetermined reference light. The distance between the holographic plate 12 and the transducer support plate 20 is adjusted so that the scale image appears to lie in the plane in which the pointer 60 is arranged to move, so that the position of the pointer relative to the scale (for a given input current supplied to the transducer) is unaffected by the position of the observer in relation to the pointer and scale image.

Whereas in the above described embodiments of the present invention, the holographic plate 12 and the movement support plate 20 are disposed in a parallel arrangement, one of those plates may (if so desired) be disposed at another angle relative to the other, so that they are not parallel. However, this is of no consequence provided that the requirement is always fulfilled, no matter what the relative disposition of those plates, that the mode of illumination of the clock or instrument when in use should be the same as that used in making the hologram (incorporated in the plate 12) of the object that is to be perceived when the clock or instrument is illuminated with reference light 33.

That requirement is fulfilled provided that (a) sources of the same reference light 33 are used both for making the hologram in the holographic plate, and for subsequently illuminating the holographic plate 12 when the clock or instrument is in use; (b) the angle of the reference light source relative to the holographic plate when illuminating it to portray an image of an object should be the same as that used when making the hologram of the object in the holographic plate, and (c) the angle of the holographic plate relative to the plane of movement of an article which is to move in association with the image produced when the holographic plate is illuminated (to portray an image of such object) should be the same as that of the holographic plate relative to that object when the hologram is being made.

Advantageously, the holographic plate 12 is arranged for exposure to reference light which is directed at it at an angle $\theta°$ lying in the range 40 to 60 degrees to the normal to the plate. Best results are obtained with an angle of 56 degrees, though an angle of 60 degrees may be more convenient in practice. Angles at the upper end of that range enable the achievement of quite compact systems comprising a clock (or other instrument) and its associated source of reference light, which compact systems are suitable for incorporation in a control board, desk or console.

Various dispositions of the holographic plate 12, the movement support plate 20 and the associated reference light source 60 are shown in the FIGS. 6 to 10. In each of those arrangements, the illuminating source of reference light is shown as directing reference light 33 at an angle $\theta°$ of approximately 56 degrees to the normal to the holographic plate. Those FIGS. may represent either plan or side views of the physical arrangements depicted.

With the silver halide process of hologram production, ordinary white light may be used to illuminate the holographic plate and to yield quite good perceivable images.

Figure 11:
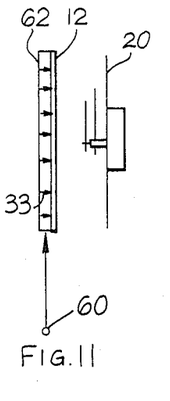
Figure 12:
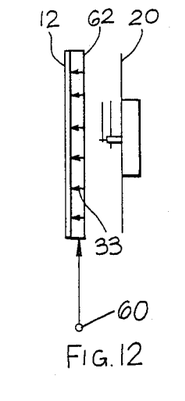

In a modified illumination system shown in the FIG. 11, the holographic plate 12 is illuminated from the front by means of a light diffusing transparent plate 62 (of glass, or a plastics material such as that known under the trade mark PERSPEX) placed immediately in front of the holographic plate and illuminated by a light source which is arranged to direct light into an edge of the transparent plate 62 in a direction which is parallel with the plane of the holographic plate. If desired, the transparent plate 62 may be placed instead immediately behind the holographic plate, so as to illuminate it from the rear, as shown in the FIG. 12.

Figure 13:
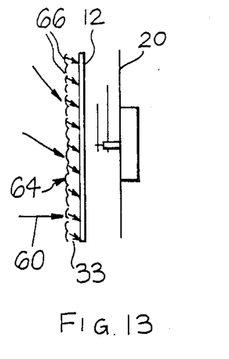

In a further illumination system shown in the FIG. 13, the holographic plate 12 is illuminated from the front by means of a planar array 64 of similar lenticular referencing devices 66, which array is placed immediately in front of the holographic plate 12 and which array is arranged to direct reference light 33 at the correct reference angle $\theta°$ on to the holographic plate no matter from what angle that array is itself illuminated. Such an array may utilise ordinary day-light as its source of reference light, or otherwise any other non-specifc source of light.

In the embodiments so far described, a holographically produced dial or scale has been used in conjunction with one or more hands or pointers which are driven relative to that dial or scale by driving means. In modified versions of those embodiments, the driving means is arranged to drive one or more pointing devices which are constituted by pieces of a holographic medium. Each such pieces is arranged to portray to an observer an image of a clock hand or instrument pointer, as appropriate, which image preferably appears to lie in coplanar relationship to the dial or scale which is produced by the holographic plate 12. The holographically produced images of the dial or scale and of the associated hands or pointers may all appear as if they are disposed behind the holographic plate, or alternatively in front of that plate.

If desired, those holographically produced hands or pointers may operate in conjunction with a real dial or scale instead, and appear as lying in the plane of that dial or scale.

Figure 14:
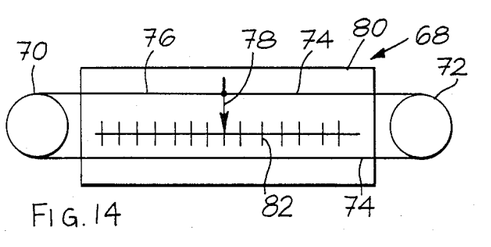
FIGS. 14 and 15 show respectively front and side views of a radio receiver wavelength indicator embodying the present invention.
Figure 15:
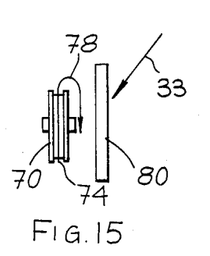

Referring now to the FIGS. 14 and 15, a wavelength or frequency indicator 68 of a radio receiver comprises two spaced rotatable pulleys 70, 72 around which is stretched an endless band 74. That band has at least one complete turn wrapping around the driving pulley 70 so that the band is driven by that pulley when it is itself driven by a tuner adjusting shaft (not shown). The upper stretch 76 of the band carries an indicating or reference pointer 78 which in cooperation with a wavelength or frequency scale indicates the position to which the tuner has been set.

In front of that pulley system is mounted a plane, transparent holographic plate 80, through which the pointer 78 is plainly visible. That plate incorporates a hologram which when illuminated in a predetermined mode by a source of a predetermined reference light 33, portrays for the observer a graduated wavelength or frequency scale 82 which appears to lie behind the holographic plate and in the plane along which the pointer 78 is intended to be moved by the endless band 74 on adjustment of the tuner.

In a modification of that tuner indicator, the pointer 78 is replaced by a piece of holographic material which when illuminated by said source of reference light 33 portrays an indicator pointer which appears to lie in the same plane as the scale 82.

In a modification or inversion of that arrangement, the scale plate 80 carries instead an actual or real frequency scale, and a holographic reference pointer plate carried by said endless band is arranged to portray when illuminated by a source of reference light 33 a reference pointer image which appears to lie in the same plane as the frequency scale markings of that scale.

Figure 16:
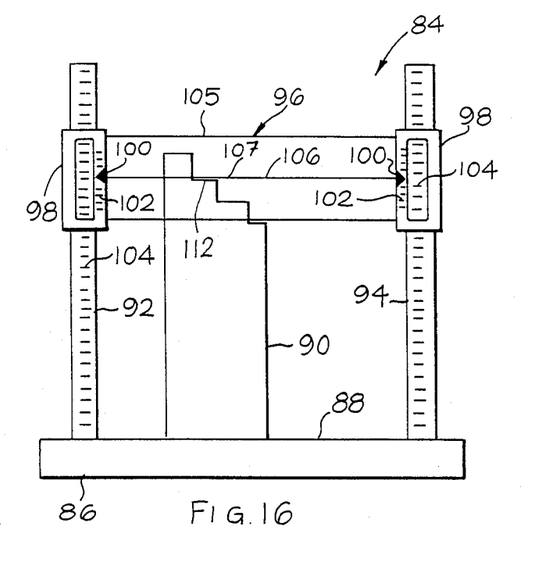
FIGS. 16 and 17 show respectively front and side views of an apparatus for measuring linear dimensions of a workpiece.
Figure 17:
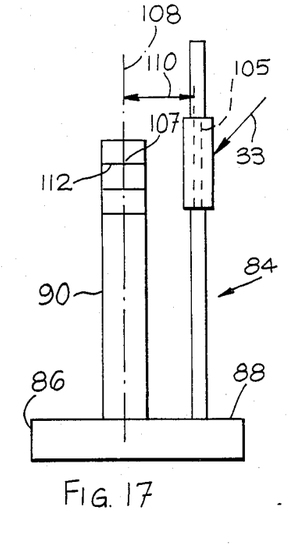

Furthermore, whereas in the two embodiments just described above, the reference pointer 78 moves relative to a fixed scale plate 80, the scale and pointer members may be interchanged so that a scale member attached to the endless band 74 is positioned thereby relative to a fixed reference pointer. In such an inverted arrangement, either one of the images of (a) the reference pointer and (b) the frequency scale may be real or actual, whilst the other may be constituted as a holographic image projected into the plane of the real or actual image. Alternatively, both of said images may be holographically produced. Referring now to the FIGS. 16 andd 17, an apparatus 84 for measuring linear dimensions of a workpiece comprises a measurement table 86 for receiving on its upper surface 88 a workpiece 90 which is to be measured. Two vertical graduated scale members 92, 94 are secured spaced apart at opposite ends of the table. A transverse measurement member 96 extends between those vertical scale members and is carried at its respective ends in sliders 98 which are arranged for sliding movement up and down those scale members. Each slider carries a reference marker 100 and an associated group of vernier graduations 102 which lie alongside the graduations or scale markings 104 carried by the respective vertical scale members 92, 94.

The transverse member 96 comprises a transparent holographic member or plate 105 which incorporates a hologram of a horizontal linear reference line 106 which is aligned with the two reference markers 100. That reference line is visible only when the holographic plate is illuminated in a predetermined mode by a source of predetermined reference light 33, and then appears to the observer as a measurement probe 107 lying in a predetermined measurement plane 108 spaced a predetermined distance 110 behind the holographic plate.

In use, a workpiece 90 having a dimension to be measured is placed upon the measurement table 86, at a position which is rearward of the holographic plate and in which position a feature 112, whose height above the datum surface 88 of the measurement table is to be measured, lies in or intersects the said measurement plane 108. The sliders 98 are then moved along the respective vertical scale members to bring the image of the horizontal reference line 106 into vertical alignment with the said feature 112. The desired dimension is then read off at the point indicated on one of the two vertical scale members by the associated reference marker 100. Since the holographic horizontal reference line 106 is seen as as probe 107 in the same rearward plane as the feature whose height is to be measured, the desired measurement can be made without risk of error due to parallax.

If desired, a further and similar transverse member (not shown) may be arranged for sliding on the two vertical scale members, so that the height measurements of two spaced features can be read off at the same time.

Measurements in the horizontal direction can be made by providing in addition at least one vertical holographic plate incorporating a hologram of a vertical reference line, and arranging that vertical holographic plate for movement in a horizontal direction by means of sliders arranged for movement along two vertically-spaced, horizontal, graduated scale members which extend between the two vertical scale members 92, 94. When illuminated by the said reference light the vertical holographic plate portrays the vertical reference line as a probe in the rearwardly displaced measurement plane 108.

If desired, those holographic plates may be arranged to portray the horizontal and vertical reference lines as measurement probes in a measurement plane that lies a predetermined distance in front of the two vertical scale members 92, 94, so that the workpiece 90 to be measured is placed on the measurement table 86 in front of those vertical scale members 92, 94.

The reference markers 100 or the scale markings 104, or both, may be portrayed by holograhic means in accordance with the principles of the present invention, so as to eliminate the possibility of parallax errors occurring when reading the workpiece dimensions.

Figure 18:
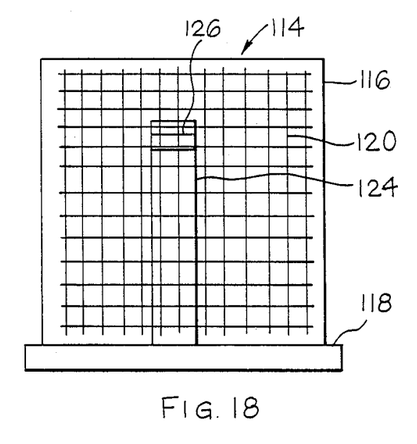
FIGS. 18 and 19 show respectively front and side views of a further apparatus for measuring linear dimensions of a workpiece.
Figure 19:
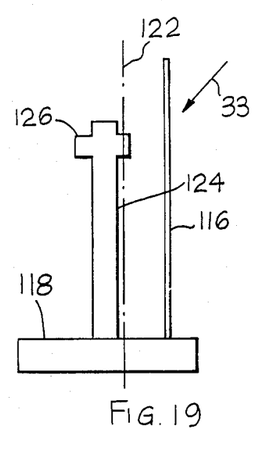

In the FIGS. 18 and 19, there is shown a vertical measurement screen 114 which comprises a plane, square holographic plate 116 mounted on a measurement table 118. That holographic plate incorporates a hologram which when illuminated in a predetermined mode by a source of predetermined reference light 33 portrays a graticule 120 in a predetermined measurement plane 122 which is displaced a predetermined distance to the rear of the holographic plate 116.

In use, a workpiece 124 having a feature 126 whose dimension relative to a datum is to be measured is placed upon the measurement table 118, with that feature positioned in or intersecting the measurement plane 122. An observer thus sees the measurement graticule in the same plane as the said feature 126, so that he may read off the position of that feature by means of the imaged graticule without risk of parallax errors.

If desired, the holographic plate 116 may be arranged to portray the graticule in a measurement plane that lies forwardly (instead of rearwardly) of the holographic plate, so that the workpiece is placed in front of the holographic plate to make the desired measurements.

A measurement screen similar to that just described may incorporate a hologram which when illuminated with the necessary reference light 33 portrays instead, in the said predetermined measurement plane 122, a series of lines radiating from the point of intersection of a pair of horizontal and vertical reference lines. Such a screen may be used to measure the angular positions of predetermined features in a workpiece.

Figures 20, 21:
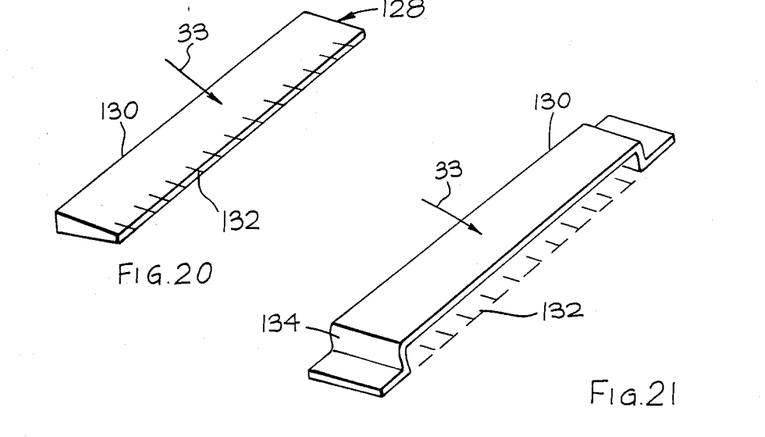
FIG. 20 shows a pictorial view of a linear ruler for measuring linear dimensions of articles.
FIG. 21 shows a modification of the ruler of FIG. 20.

FIG. 20 shows a linear ruler 128 comprising a plane holographic strip 130 in which is incorporated a hologram which when illuminated by a source of said reference light 33 portrays a series of graduation marks which constitute a measuring scale 132 for measuring dimensions on an article placed beneath the ruler. Those graduations preferably appear to the observer as if they lie at the underside surface of the ruler, so as to seem to lie directly on the surface of the article itself. Thus, measurements can be made without risk of parallax error, and without fear of damaging the scale markings by abrasion of the workpiece surface.

Where such a ruler is provided with end supports or spacers (as shown at 134 in the FIG. 21) for raising it off the surface of the article to be measured, the hologram may be arranged to portray the scale graduations as lying in the plane of the surface of the article on which the ruler is supported and in which the desired measurements are to be made.

Figure 22:
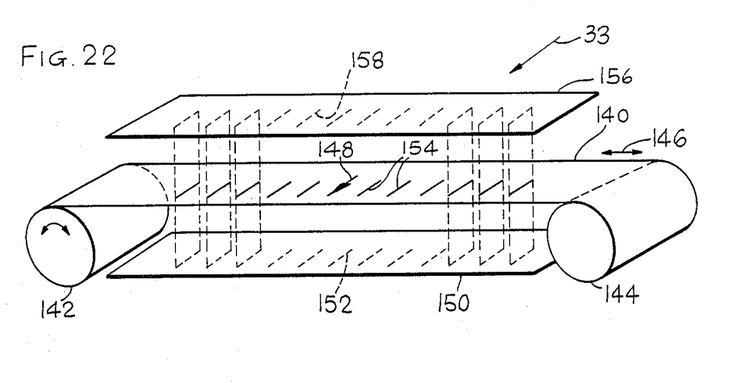
FIGS. 22 and 23 show pictorially and in front view respectively an altlernative form of radio receiver wavelength indicator.
Figure 23:
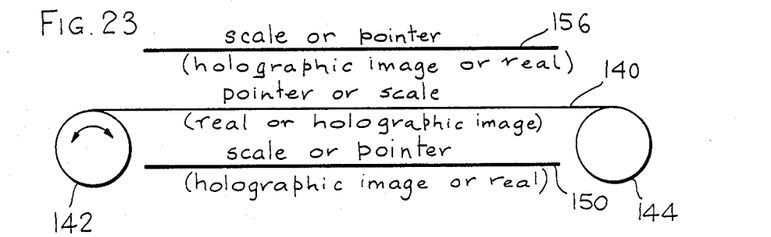

Referring now to the FIGS. 22 and 23, an alternative form of the wavelength or frequency indicator of FIGS. 14 and 15 is shown. In that alternative embodiment, a transparent band 140 is stretched over two parallel rollers 142, 144, one (142) of which is coupled to a manual or other driving means (not shown) for operating the associated tuner (not shown), and so drives the band to and fro as required in the direction of the double-headed arrow 146 as the tuner is adjusted. That band may have either (a) its respective ends wound on the respective rollers, or (b) a lower run (not shown) extending between the bottom sides of the rollers so as to form an endless band with the upper run.

The band carries on the upper run thereof an opaque reference marker arrow 148 which moves with the band as it is transported between the rollers.

A frequency scale plate 150 is disposed below the upper run of the transparent band and incorporates a hologram 152. That hologram when illuminated by a suitable source of reference light portrays for the observer a series of scale marking images 154 which appear as being coplanar with the opaque marker arrow 148 on the upper run of the transparent band.

If desired, as an alternative, the holographic frequency scale plate may be moved to an alternative upper position 156 above the upper run of the band. In that case, the scale plate is transparent and incorporates a hologram 158 which when illuminated by a suitable source of reference light 33 portrays for the observer a series of frequency scale marking images 154 which likewise appear as being coplanar with the reference marker arrow 148.

If desired, the dispositions of the reference marker arrow 148 and the frequency scale marking hologram 152 or 158 on the respective components 140, 150, 156 may be interchanged in either of those two alternative embodiments.

Moreover, those embodiments may also be modified so as to substitute for the means for producing a real image (of a reference marker or the scale markings) a means for producing that image holographically. The various combinations that are possible are indicated by the various inscriptions in the FIG. 23.

Moreover, the reference marker and scale markings may be arranged to be coplanar at the plane of the upper run 140 of the band, or at the upper or the lower position 156, 150 of the scale plate.

If desired, both of the reference marker and the series of scale markings may be portrayed as holographic images, with the reference marker always coplanar (or at least substantially so) with the series of scale markings.

Figure 24:
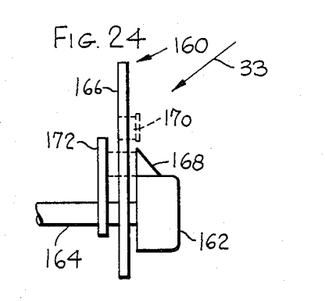
FIGS. 24 and 25 show side and front views respectively of a radio receiver waveband indicator and selection switch.
Figure 25:
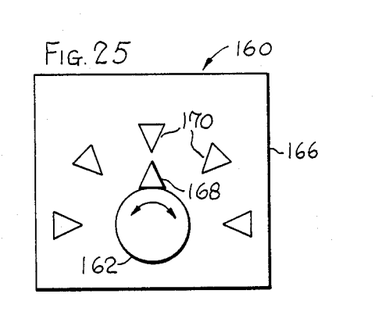

Referring now to the FIGS. 24 and 25, a radio waveband selector switch 160 has an operating knob 162 carried on a shaft 164 which extends through an indicator plate 166 from a waveband changeover device (not shown). That knob carries a reference pointer 168, and is rotatable to any one of the four positions indicated by the waveband markings 170. The indicator plate 166 comprises a holographic plate which incorporates a reflective hologram which when illuminated by a source of suitable reference light 33 portrays the waveband markings 170 in a plane forward of the plate and coplanar with the tip of the reference pointer 168 of the selector knob 162.

In a modified form of that selector switch, the reference pointer 168 is omitted, and a holographic reference pointer plate 172 is secured on the shaft 164 behind the indicator plate 166. That reference pointer plate 172 incorporates a hologram which when illuminated by a source of suitable reference light 33 portrays an image of a reference pointer in coplanar relation with the holographic waveband marking images 170.

Alternatively, if so desired, the waveband markings are permanently inscribed on a translucent indicator plate which replaces the holograhic plate 166, and the holographic reference pointer plate 172 is arranged to portray an image of a reference pointer in coplanar relation with the real waveband markings on the substitute waveband indicator plate.

Figure 26:
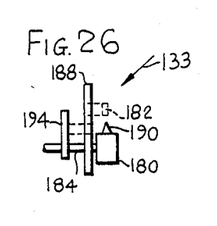
FIGS. 26 and 27 show side and front views respectively of a slider-type electrical control device.
Figure 27:
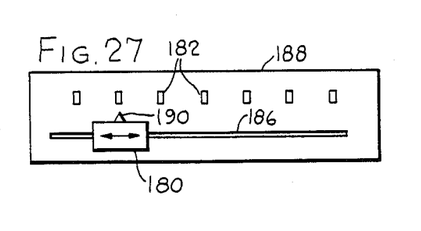
Figure 28:
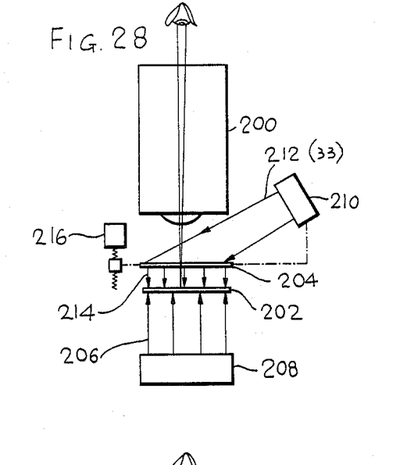
FIGS. 28 to 31 show in side view different arrangements respectively of the peripheral components used in a high magnification dimension measuring system.
Figure 29:
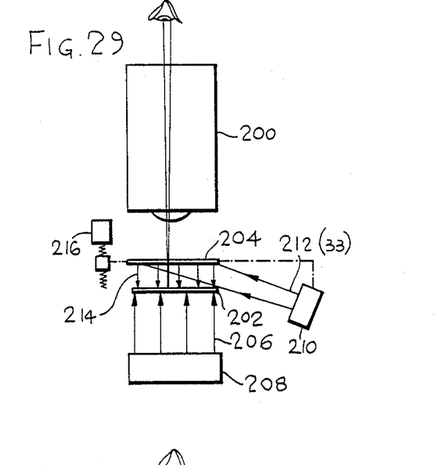

The FIGS. 26 and 27 show an analogous arrangement applied to a slider-type electrical control/adjustment device in which a slider knob 180 can be aligned, by sliding, with any one of a number of scale markings 182. The slider knob 180 is carried on a shaft 184 which protrudes from the control/adjustment device through a slot 186 formed in the indicator plate 188. The slider knob carries a reference pointer 190, which cooperates with the scale markings 182.

The indicator plate 188 comprises an opaque holographic plate which incorporates a reflective hologram which when illuminated by a source of suitable reference light 33 portrays for an observer the scale markings 182. Those markings appear in front of the plate, in the forward plane of the tip of the reference pointer 190. Instead of using the actual reference pointer, a holographically produced image of the pointer may be portrayed in the plane of the scale markings 182 by means of a holographic reference pointer plate 194 carried on the shaft 184.

The application of the present invention in performing measuring operations, as illustrated with reference to the FIG. 16, 17 and 18, 19, may be advantageously extended to the making of measurements of very small physical features such as are revealed when examining very small objects or specimens in high magnification systems. This extension of the invention is illustrated in the FIGS. 28 to 31, which will now be described.

In those FIGS., a high magnification microscope system 200 (which may be an optical system or an electron microscope system) has mounted above its specimen plate 202 a transparent holographic plate 204 which incorporates in a hologram a set of measurement scale markings of any suitable nature, e.g. a graticule (such as that shown at reference 120 in the FIG. 18), a diffraction grating, or any other optical device that can be related or adapted to the making of comparative measurements.

The specimen plate 202 (and any specimen carried thereon) is illuminated from below by a light 206 emanating from a suitable light source 208. In the FIGS. 28 and 29, a source 210 of hologram reference light 212 (33) is arranged to illuminate the hologram in said holographic plate 204 at a predetermined reference angle from above or below, so as to portray in a predetermined measurement plane at or adjacent the specimen plate 202 the said set of measurement scale markings. The direction of projection of those calibration markings is indicated by the vertical arrows 214.

Manual or power operated adjustment means 216 are provided for adjusting the vertical position of the holographic plate 204 and its associated reference light source 210 relative to the specimen plate 202, so as to bring the holographically produced images of the measurement scale markings into a desired measurement plane which includes the feature whose position is to be measured.

Figure 30:
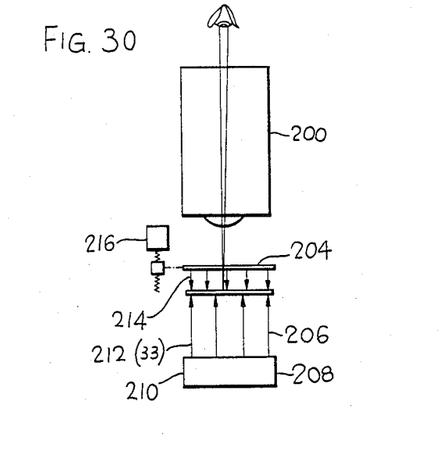
Figure 31:
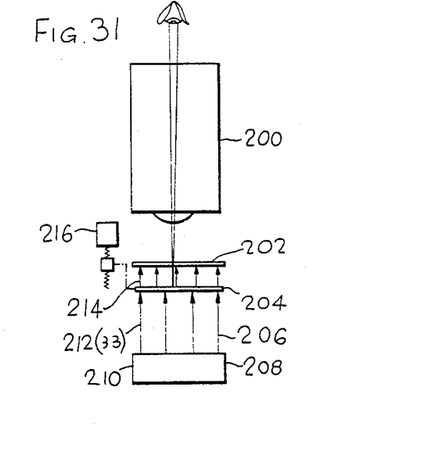

In the FIGS. 30 and 31, the light 206 from the specimen illumination source 208 also serves as the reference light source 212 (33) for the holographic plate. That reference light portrays, as in the FIGS. 28 and 29, in a predetermined measurement plane at or adjacent the specimen plate 202 the said set of measurement scale markings. The holographic plate 204 is likewise provided with manual or power operated vertical position adjustment means.

If desired, any one of the holographic plates of the FIGS. 28 to 31 may comprise a miniature version of the holographic plate 105 of the embodiment of the FIGS. 16 and 17, arranged to slide horizontally relative to the specimen plate on two graduated scale members which are analogous to those referenced 92, 94 in the FIGS. 16 and 17. Thus, a holographically produced image of a reference marker line or probe (such as that referenced 106, 107 in those FIGS.) may be traversed in a horizontal plane parallel to the specimen plate. Other holographically produced images of other reference marker lines or probes, orthogonal to those referred to above, may be traversed by means of other sliders which move on other calibrated scale members (similar to 92 and 94) disposed orthogonally to the first-mentioned scale members. Hence, measurements in mutually orthogonal directions can be readily made.

Alternatively, the holographic plates of the FIGS. 28 to 31 may comprise a graticule plate similar to that shown at 116 in the FIGS. 18 and 19.

The positions of the specimen and holographic plates 202, 204 may be interchanged if desired.

Whereas in the above described embodiments the various holograms (i.e. the holographic elements) have all been of planar form, other embodiments of the present invention may use instead holograms having non-planar forms, e.g. cylindrical, conical or spherical forms, or combinations of those various forms (including planar forms).

The present invention may also be applied to magnetic tape cassettes for use in video or audio tape recording and/or replaying apparatus. In order to indicate the position on a magnetic tape record at which a particular recording is to be found, there is provided in each side wall of the cassette a small transparent window which bears a series of spaced gradations or scale markings, against which the diameters of the respective reels of magnetic tape carried on the respective spools can be assessed so as to determine or indicate the position of the particular recording.

Those scale markings are usually spaced away from the sides of the reels of magnetic tape, so that parallax error can occur when a user assesses the position of a particular recording. Thus, it is difficult to determine with any reasonable accuracy that position when seeking to replay the desired recording. In order to eliminate the possibility of parallax error occurring, the present invention provides a cassette in which each said side wall window comprises or is provided with a transparent holographic element which when illuminated by a source of the requisite reference light portrays for the observer a set of holographic scale markings which lie in or closely adjacent the plane which includes the adjacent sides of the respective reels of magnetic tape.

Figure 32:
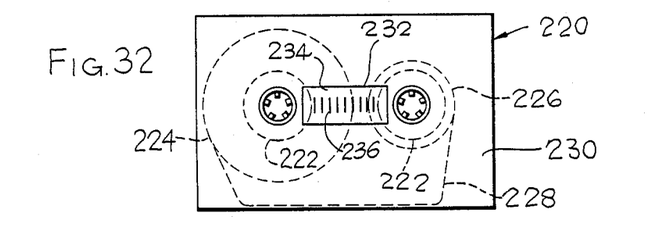
FIG. 32 shows, in side view, a magnetic record tape cassette embodying the present invention.

One magnetic tape cassette according to the present invention is shown, in side view, in the FIG. 32. The cassette comprises a casing 220 in which are mounted two tape spools 222 on which are wound two reels 224, 226 of a single piece of magnetic recording tape 228. Portions of those spools and tape reels are visible through the respective side walls 230 of the cassette casing at appropriate positions in which are secured transparent windows 232. Each such window comprises or incorporates a plane, transparent holographic element 234, which when illuminated by a source of a predetermined reference light portrays for an observer a set of spaced scale markings 236 which appear to lie in the plane which includes the adjacent sides of the respective tape reels. Thus, when determining the position of a particular recording, the diameter of either one of the two reels can be determined accurately from the scale markings without fear of parallax error. Features of any one embodiment described above may be applied wherever appropriate in any other of the embodiments. Moreover, the principles of the present invention may be applied in any device where the position of one component relative to another is to be indicated.

The present application lays claim to priority from the following UK patent applications Nos. 8505969 filed Mar. 7 1985, 8517820 filed July 15 1985, and 8529614 filed Dec. 2 1985, to which the reader's attention is hereby directed for further information. The specifications of those earlier applications are hereby incorporated in this specification by this reference to them.

I claim:

1. Analogue indicating means comprising two relatively movable components (FIGS. 1-3: 26/28 and 12) respectively having associated therewith a reference marker (30/32), and a scale portion (46) bearing a series of scale markings (48) spaced apart along the scale portion (46), the position of the reference marker (30/32) relative to said scale markings (48) being indicative to an observer of the relative positions of the two components (26/28 and 12), wherein at least one (26/28 or 12) of said two components comprises a hologram which, when illuminated by a source of a predetermined reference light, (33) portrays to the observer a holographic image of said reference marker (30/32) or holographic images of said scale markings (48), as appropriate to the said one component, for comparison with, respectively, the said scale markings (48) or the said reference marker (30/32) of the other (12 or 30/32) of said two components when the two components lie in cooperating positions, said hologram being arranged so as to project the said holographic image or images into a plane disposed near or at the plane of the scale markings (48) or reference marker (30/32) respectively of the said other (12 or 26/28) of said two components, so as to diminish parallax errors when determining the position of said reference mark relative to said scale markings.

2. Indicating means according to claim 1, wherein the said other (12 or 26/28) of said two components comprises a hologram which, when illuminated by a said source of reference light, (33) portrays to said observer a series of holographic images of said scale markings (48) or a holographic image of said reference marker (30/32), as appropriate to the said other component, for comparison with respectively the said holographic reference marker image or holographic scale marking images associated with the said one component (26/28 or 12).

3. Indicating means according to claim 2, wherein the respective holograms are arranged so as to project their respective holographic images into a predetermined common plane, so as to be perceived there by said observer in coplanar relationship.

4. Indicating means according to claim 1, wherein said one component (26/28 or 12) comprises a hologram arranged to project holographic images of said scale markings (48) forwardly towards a said observer into a plane forwards of said hologram, in or adjacent which plane said reference marker (30/32) of said other component (12 or 26/28) is arranged to move.

5. Indicating means according to claim 4, wherein said other (12 or 26/28) of said two components comprises a hologram arranged so as to project a holographic image of said reference marker (30/32) into a plane in or adjacent which the said holographic scale markings (48) are perceived by said observer.

6. Indicating means according to claim 4, wherein said hologram of said one component (26/28 or 12) is also arranged to project holographic images of other desired features (34–36) of said one component, which features lie adjacent or enclose said series of scale markings (48).

7. Indicating means according to claim 4, having a driving means (24) for driving one said component (26/28 or 12) relative to the other (12 or 26/28) and hence said reference marker (30/32) relative to said scale markings (48), and wherein said hologram is provided with an aperture (18), and said driving means (24) has a shaft (26/28) which extends forwardly through said aperture (18) and carries forwardly of said hologram said other component (26/28) which bears said reference marker (30/32).

8. Indicating means according to claim 1, wherein said one component (26/28 or 12) comprises a hologram arranged to project holographic images of said scale markings (48) rearwardly away from a said observer into a plane disposed rearwards of said hologram, in or adjacent which plane said reference marker (30/32) of said other component (12 or 26/28) is arranged to move.

9. Indicating means according to claim 8, wherein said other (12 or 26/28) of said two components comprises a hologram arranged so as to project a holographic image of said reference marker (30/32) into a plane in or adjacent which the said holographic scale markings (48) are perceived by said observer.

10. Indicating means according to claim 8, wherein said hologram of said one component (26/28 or 12) is also arranged to project holographic images of other desired features (34-46) of said one component, which features lie adjacent or enclose said series of scale markings (48).

11. Indicating means according to claim 1, wherein said one component comprises a hologram arranged so as to project a holographic image of said reference marker (30/32) into or adjacent a plane in which the scale markings (48) of the other of said two components are perceived by said observer.

12. Indicating means according to claim 1, including driving means (24) for driving one of said two components (26/28 and 12) relative to the other to thereby adjust the relative positions of said reference marker (30/32) and said series of scale markings (48).

13. Indicating means according to claim 12, wherein said driving means (24) comprises an integrating means arranged to adjust said relative positions of said two components (26/28 and 12) in dependence upon the integral of successive energy pulses received by the integrating means.

14. Indicating means according to claim 13, wherein said driving means (24) comprises a time-keeping means.

15. Indicating means according to claim 12, wherein said driving means comprises a transducer (56) arranged to adjust said relative positions of said two components (60 and 12) in dependence upon the instantaneous magnitude of a variable input quantity supplied to the transducer.

16. Indicating means according to claim 12, wherein said driving means comprises a multi-position operating mode selector (FIG. 14: 70; FIG. 22: 142; FIG. 24: 162/164; FIG. 26: 180/184) which is operable to select any one of a plurality of different operating modes of an associated apparatus, said selector being arranged to adjust said relative positions of said two components in accordance with the operating mode selected.

17. Analogue indicating means comprising two relatively movable components (FIGS. 1-3: 26/28 and 12) respectively having associated therewith a reference marker (30/32), and a scale portion (46) bearing a series of scale markings (48) spaced apart along the scale portion (46), the position of the reference marker (30/32) relative to said scale markings (48) being indicative to an observer of the relative positions of the two components (26/28 and 12), wherein at least one (26/28 or 12) of said two components comprises a hologram which, when illuminated by a source of a predetermined reference light (33), portrays to the observer a holographic image of said reference marker (30/32) or holographic images of said scale markings (48), as appropriate to the said one component, for comparison with respectively the said scale markings (48) or the said reference marker (30/32) of the other (12 or 30/32) of said two components when the two components lie in cooperating positions, said hologram being arranged so as to project the said holographic image or images into a plane disposed near or at the plane of the scale markings (48) or reference marker (30/32) respectively of the said other (12 or 26/28) of said two components, so as to diminish parallax errors when determining the position of said reference mark relative to said scale markings, wherein said component bearing a reference marker comprises a workpiece or specimen (FIG. 16: 90; FIG. 18: 124) having as said reference marker a selected feature (112; 126) whose position relative to a predetermined datum (86, 88; 118) is to be measured when said workpiece is introduced temporarily into a measuring position adjacent said component (92, 107; 116) bearing said scale markings, and wherein said component bearing said scale marking includes a hologram which when illuminated by a source of said reference light (33) portrays holographic images of said scale markings (102-107; 120), which holographic images appear to a said observer as lying in a measurement plane (108; 122) which intersects said reference marker feature (112; 126) on said workpiece.

18. Indicating means according to claim 17, wherein said scale markings comprise successive markings denoting successive increments of length.

19. Indicating means according to claim 18, including a magnifying system (FIGS. 28-31: 200) through which a said observer may observe said workpiece or specimen (202) and said holographic images (214).

20. Indicating means according to claim 17, wherein said scale markings comprise successive markings which denote successive increments of angle.

21. Indicating means according to claim 17, including a magnifying system (FIGS. 28-31: 200) through which said observer may observe said workpiece or specimen (202) and said holographic images (214).

22. Indicating means according to claim 21, wherein said hologram (204) is disposed between said magnifying system (200) and said workpiece or specimen (202).

23. Indicating means according to claim 21, wherein said hologram (204) is disposed on the side of said workpiece or specimen (202) that is remote from said magnifying system (200).

24. Indicating means according to claim 17, arranged for the determination of the position relative to a predetermined datum (FIG. 16: 88) of a selected feature (112) of a workpiece or specimen (90), wherein said component (96) bearing said reference marker (100, 106) incorporates a hologram (105) which when illuminated by a source of predetermined reference light (33) portrays a measurement probe (107) which extends from said reference marker (100, 106) to a predetermined measurement position in a predetermined measurement plane (108) that is displaced from the plane of said hologram (105) in a direction normal thereto, whereby said determination can be made by (a) first locating said workpiece or specimen (90) at least temporarily with said selected feature (112) disposed in said measurement plane (108), (b) then by moving said reference marker bearing component (96) in a manner such as to cause said probe (107) to settle at said selected feature (112), and (c) finally, reading the position of said reference marker (100, 106) relative to said scale markings (102, 104).

25. Analogue indicating means comprising two relatively movable components (FIGS. 1-3: 26/28 and 12) respectively having associated therewith a reference marker (30/32), and a scale portion (46) bearing a series of scale markings (48) spaced apart along the scale portion (46), the position of the reference marker (30/32) relative to said scale markings (48) being indicative to an observer of the relative positions of the two components (26/28 and 12), wherein at leat one (26/28 or 12) of said two components comprises a hologram which, when illuminated by a source of a predetermined reference light (33), portrays to the observer a holographic image of said reference marker (30/32) or holographic images of said scale markings (48), as appropriate to the said one component, for comparison with, respectively, the said scale markings (48) or the said reference marker (30/32) of the other (12 or 30/32) of said two components, said hologram being arranged to as to project the said holographic image or images into the plane of the scale markings (48) or reference marker (30/32), respectively, of the said other (12 or 26/28) of said two components, said component bearing a reference marker comprising a workpiece or specimen (FIG. 16: 90; FIG. 18: 124) having as said reference marker a selected feature (112; 126) having a position relative to a predetermined datum (86, 88; 118) to be measured when said workpiece is introduced temporarily into a measuring position adjacent said component (92-107; 116) bearing said scale markings, and wherein said component bearing said scale markings includes a hologram which, when illuminated by a source of said reference light (33), portrays holographic images of said scale markings (102-107; 120), which holographic images appear to a said observer as lying in a measurement plane (108; 122) which intersects said reference marker feature (112; 126) on said workpiece.

26. Analogue indicating means comprising two relatively movable components (FIGS. 1-3: 26/28 and 12) respectively having associated therewith a reference marker (30/32), and a scale portion (46) bearing a series of scale markings (48) spaced apart along the scale portion (46), the position of the reference marker (30/32) relative to said scale markings (48) being indicative to an observer of the relative positions of the two components (26/28 and 12), wherein at least one (26/28 or 12) of said two components comprises a hologram which, when illuminated by a source of a predetermined reference light (33), portrays to the observer a holographic image of said reference marker (30/32) or holographic images of said scale markings (48), as appropriate to the said one component, for comparison with, respectively, the said scale markings (48) or the said reference marker (30/32) of the other (12 or 30/32) of said two components when the two components lie in cooperating positions, said hologram being arranged so as to project the entire holographic image or images into the same plane as a plane containing the scale markings (48) or reference marker (30/32), respectively, of said two components.

* * * * *